Aug. 27, 1968

C. M. LENTS 3,398,550

LIQUID SUPPLY CONTROL SYSTEM FOR A BEVERAGE DISPENSER

Filed Sept. 5, 1967

INVENTOR
*Charles M. Lents*

BY *Thomas A. Harwood*

ATTORNEY

Aug. 27, 1968  C. M. LENTS  3,398,550
LIQUID SUPPLY CONTROL SYSTEM FOR A BEVERAGE DISPENSER
Filed Sept. 5, 1967  3 Sheets-Sheet 2

INVENTOR
Charles M. Lents

BY Thomas A. Harwood
ATTORNEY

Aug. 27, 1968     C. M. LENTS     3,398,550
LIQUID SUPPLY CONTROL SYSTEM FOR A BEVERAGE DISPENSER
Filed Sept. 5, 1967     3 Sheets-Sheet 3

INVENTOR
Charles M. Lents

Thomas A. Harwood
ATTORNEY

United States Patent Office 3,398,550
Patented Aug. 27, 1968

3,398,550
LIQUID SUPPLY CONTROL SYSTEM FOR A
BEVERAGE DISPENSER
Charles M. Lents, Dallas, Tex., assignor of one-half to
Earl J. Bauer, Dallas, Tex.
Filed Sept. 5, 1967, Ser. No. 665,552
9 Claims. (Cl. 62—179)

ABSTRACT OF THE DISCLOSURE

There is shown and described a system for controlling the supply of liquid or fluid ingredients to a carbonated frozen drink machine. The machine has an inlet through which the liquid is supplied, and a plurality of electrodes are employed to detect the level of the liquid within the inlet. Control means connected to the electrodes controls the supply of ingredients to the chamber. Additional electrodes that are connected to the control means are employed in the feeder lines from the ingredient supply tanks to deactivate the system when the supply tanks are exhausted.

---

This invention constitutes an improvement in the control of the supply of ingredients to a carbonated frozen drink machine of the type disclosed in the copending patent application of Earl J. Bauer and Charles M. Lents entitled, Process and Apparatus for the Preparation and Dispensing of a Beverage, Ser. No. 613,021, filed Jan. 31, 1967.

The above-noted copending application describes a machine or apparatus for preparing and dispensing frozen, carbonated beverages of the soft drink variety in which the beverage is prepared and frozen within a chamber under atmospheric pressure and is dispensed at atmospheric pressure. Carbonation of the beverage is effected in the premixing of the ingredients and within the mixing chamber during freezing under substantially atmospheric conditions. This is made possible by injecting a mixture of water, syrup and carbon dioxide into the chamber in a well mixed and foamy state, and by sufficiently agitating the beverage within the chamber. An important feature of the apparatus disclosed in this copending application is the maintaining of the beverage within the refrigerated chamber at a level or volume which is substantially less than the volume of the chamber itself. Baffle means, or other equivalent means, are employed to prevent the carbon dioxide which exists in the space above the level of the beverage from returning to the atmosphere. More particularly, an inlet is provided to the chamber through which the liquid ingredients and carbon dioxide are supplied to the chamber but in which the inlet itself is open to the atmosphere. The inlet consists of a conduit through which the ingredients are injected into the chamber and in which the bottom of the conduit is disposed below the level of the beverage within the chamber. Thus the carbon dioxide must penetrate the beverage itself in returning to the atmosphere through the inlet, thus precluding the escape of any carbon dioxide that comes out of the solution. Consequently, a carbon dioxide atmosphere is maintained within the chamber for further carbonization of the beverage as it is agitated.

The control of the level of the beverage within the chamber is important and must be regulated carefully to produce a beverage having the desired ingredient ratio and consistency. Since the chamber is refrigerated to freeze the beverage contained therein, and since the inlet conduit is thermally connected to the chamber and the beverage, the beverage tends to freeze within the inlet conduit. Moreover, as the beverage within the chamber is frozen, it expands and has a tendency to rise within the inlet conduit. The problem of sensing the level of the beverage is compounded by the fact that, as the beverage freezes within the inlet conduit, pockets or voids tend to form within the neck of the conduit. This, itself, gives a false indication of the actual level of the beverage within the chamber. Using electrode sensors wherein an electrically conducting path through the beverage must be established to yield an indication of level is hampered and often results in erroneous indications because of the voids that can be created due to freezing and expansion.

It is with reference to the accurate control of the level of the beverage within the mixing and freezing chambers that the present invention is primarily directed, and it may be stated as the broad general object of the invention to provide a control system for accurately controlling the level of the beverage in such a chamber.

In conjunction with the control system mentioned above, it is another object to provide a control system that also detects when the water or syrup supply is exhausted, and to deactivate the system in this event.

Still another object is to provide a system for controlling the supply of a fluid or liquid to any chamber as depends upon the level within the chamber, especially as relates to a chamber having an inlet conduit through which the liquid or fluid is supplied in which the liquid or fluids tend to collect in the inlet conduit in a frozen state or otherwise that would ordinarily give rise to an erroneous indication of the actual level within the chamber.

In accordance with the above objects, the invention provides a control system for operating a carbonated frozen beverage apparatus, the latter of which includes a chamber within which the beverage is mixed and frozen and dispensed under substantially atmospheric pressure. The beverage apparatus includes an inlet conduit through which the ingredients of the beverage are supplied to the chamber, essentially under gravity flow. A plurality of electrodes are employed within the inlet conduit to detect the level of the liquid within the chamber. Control means are connected to the electrodes and to supply means for supplying ingredients to the chamber through the inlet when the electrodes indicate that the beverage has dropped below a predetermined level within the chamber, and to deactivate the supply to the chamber when the electrodes detect that the beverage within the chamber has attained a predetermined maximum level. The plurality of electrodes are so employed that, even though pockets or voids are present in the inlet conduit that would ordinarily give rise to an erroneous reading, the correct amount of ingredients is supplied to the chamber each time frozen beverage is dispensed from the machine. In a preferred embodiment, three electrodes are employed that are disposed in a vertical array, whereby the level within the inlet conduit must drop below the lowest electrode before the supply system is actuated. The control means deactuates the supply system when the level rises to the height of the second or intermediate electrode, only if the liquid provides a continuous electrical conducting path between this intermediate electrode down through the inlet, the beverage contained within the chamber and to the chamber itself. Should a void or pocket be created between the intermediate electrode and the bottom of the inlet conduit, the electrical conducting path will be broken, and the control means will continue to maintain the supply system actuated to allow the beverage within the inlet conduit to rise to the height of the third or highest electrode, so that a conducting path is provided between the highest electrode and the intermediate electrode. The highest electrode is connected directly to the chamber, so that the control means deactuates the supply system to shut off any further supply to the chamber.

Electrode means are also employed in the conduits leading from the syrup and water supply tanks so as to enable the control means to deactuate the system should any one or more of the supply tanks become exhausted. In a preferred embodiment, a pair of spaced apart electrodes are employed in each of the supply lines, and as long as the supply line is full to provide a conducting path between the spaced apart electrodes, the system will be maintained in an actuated condition. When a supply tank becomes exhausted so as to eliminate the conducting path through the liquid between the spaced apart electrodes, the control means deactuates the entire system. In this manner the operator knows that the machine is empty and that additional water, or syrup, or both must be added.

Many other objects, features and advantages will become readily apparent from the following detailed description of the invention when taken in conjunction with the appended claims and the attached drawings, wherein like reference numerals refer to like parts throughout the several figures, and in which:

Figures 1, 2, 3, 4:
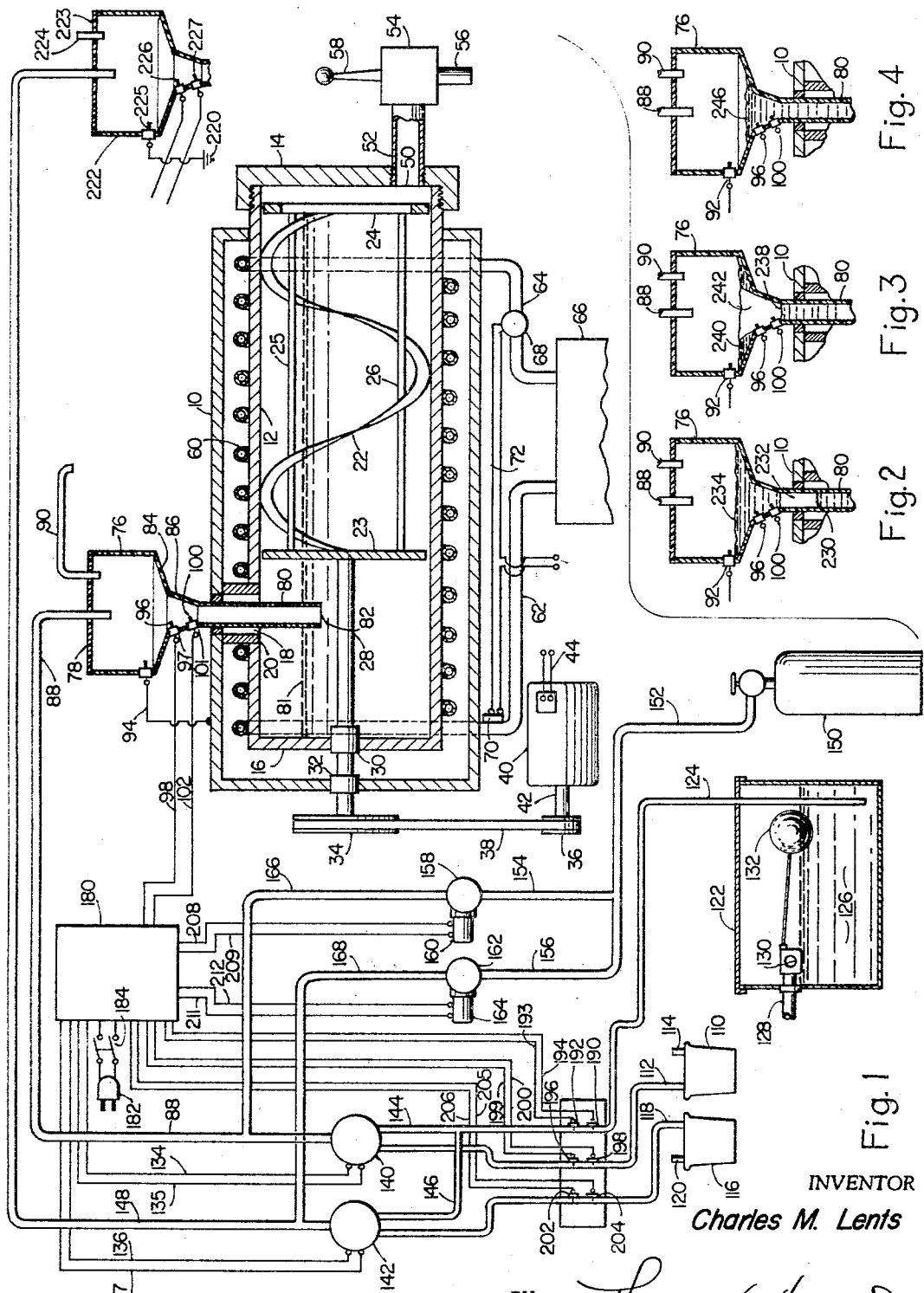
FIGURE 1 is a side elevational view, in section, of an apparatus for producing and dispensing carbonated, frozen beverages of the soft drink variety, and supply means and control means shown schematically for use therewith.
FIGURE 2 is a fragmentary, side elevational view, in section, of the inlet conduit and sensing electrodes employed with the apparatus showing frozen beverage within the inlet conduit when a void or pocket is created within the conduit.
FIGURE 3 is a fragmentary, side elevational view, in section, of the same inlet conduit when the beverage contained therein is in a different condition.
FIGURE 4 is a fragmentary, side elevational view, in section, of the same inlet when the beverage is in a yet different condition.

A beverage machine essentially of the type disclosed in the above-noted copending application in which the beverage is mixed, frozen and dispensed under substantially atmospheric conditions, is shown in side elevational view, in section, of FIGURE 1. The machine comprises a metal outer container 10 which encloses in spaced relation therefrom a metal refrigeration chamber 12, the latter within which beverage is mixed and frozen. Inner container 12 is equipped with a front end plate 14 that is screwed onto the front end thereof and that can be removed to clean the inner chamber. The inner chamber also includes an integral back wall 16, wherein the inner chamber is preferably of cylindrical shape. An opening 18, preferably cylindrical in cross-section, is provided in the top of the inner chamber, and cylindrical wall 20 extends up from the opening to connect to the outer chamber 10. The opening is provided for an inlet conduit to be disposed therein for supplying the inner chamber with the beverage ingredients.

A generally helical dasher 22 is contained with the inner chamber and supported between a solid end plate 23 disposed just in front of the opening 18 and an annular ring 24 disposed adjacent the front end of the container. Support rods 25 and 26 are connected between member 23 and 24 to give further strength to the arrangement. The dasher is continually rotated during operation within the chamber and scrapes the inner walls thereof to continually mix the beverage within the container as it is frozen and to remove any beverage that freezes to the inner walls.

The dasher is rotated by means of a shaft 28 attached to the rear plate 23 and journaled through bearings 30 and 32 contained within the rear wall 16 and rear wall of the outer container, respectively. The shaft is connected to a pulley 34 and is driven by means of a belt 38 and another pulley 36 attached to a motor 40 connected to pulley 36 through shaft 42. The motor is driven from any suitable A.C. source by means of connections 44.

An outlet or opening 50 through which the frozen beverage is dispensed is provided in the front plate 14, and connected to the opening is an outlet conduit 52 threaded therein. A dispensing valve 54 is connected to the conduit 52, and beverage is dispensed through the discharge spout 56 connected to the valve by actuating lever 58.

Cooling coils 60 are disposed about the inner chamber 12 in thermal contact therewith and are connected by means of extensions 62 and 64 to a conventional refrigeration unit 66. The refrigeration unit is of any suitable design, such as that which employs a compressor, cooling coils and condenser coils arrangement, or a gas refrigeration unit. Sensor means 70 attached to extension 62 through which the refrigerant returns to the refrigeration system detects the condition of the refrigerant, and is connected to a source of A.C. voltage and valve 68 through connections 72. Valve 68 connected in extension 64 through which the refrigerant is supplied to the cooling coils is actuated responsive to the detector. Detector or sensor 70 is of any suitable construction well known in the art and can comprise a thermostat, a pressure transducer, or any other suitable detector for determining the temperature, pressure or condition of the refrigerant returning from the cooling coils. A further description of the refrigeration system will not be given as such systems are well known in the art.

A supply inlet 76 is disposed in opening 18 and includes a conduit 80 that extends through both the inner and outer containers 12 and 10, respectively. The ingredients from which the beverage is comprised is supplied to the inner chamber through the inlet and conduit. The inlet, in its preferred embodiment, comprises an enlarged, cylindrical upper portion 76 having a top cover member 78, a tubular extension 80 that extends through the outer container 10, inner chamber 12 and down below the average level of the beverage within the container, a first intermediate section 84 of conical cross-section disposed immediately adjacent to the upper section and whose sides are disposed at a slight angle to the horizontal, and another intermediate section 86 of conical cross-section whose sides are disposed at an angle very near to the vertical and which connects section 84 and tubular section 80. The top or lid 78 is provided to maintain a sanitary condition within the inlet conduit and chamber. A conduit 88 extends through and opens into the inlet 76 through which the combination of syrup, water and carbon dioxide are supplied to the inner chamber 12. Another conduit 90 extends through and opens into the inlet and is open to the atmosphere at its other end to maintain the inlet and chamber 12 at atmospheric pressure, and also acts as a conduit through which overflow of liquid supplied to the inlet can pass should such an occasion arise.

For reasons to be explained hereinafter, the inlet is preferably fabricated of an electrically, non-conductive material, such as a plastic composition, or alternatively is electrically insulated from the metallic container 10. A first electrode 92 extends through the enlarged upper section of the inlet so that the tip thereof will be in electrical contact with any liquid or frozen material contained within the upper section 76, and is secured in the wall of the upper section by any suitable connector 93. Electrode 92 is connected to the metallic outer container 10 by means of connection 94. Connected through the lowermost intermediate section 86 is another electrode 96 secured therein by connector 97, and this electrode is connected to electrical connection 98. Electrode 96 is connected in the uppermost part of section 86 immediately adjacent the slightly angled section 84. Connected in the bottom of the lowermost intermediate section 86 immediately adjacent the tubular portion 80 is another electrode 100 secured therein by connector 101, and this electrode is connected to electrical connection 102. The metal outer container 10 is connected to ground 220 through connection 218, wherein this ground constitutes the reference potential for the entire system. Moreover, metal container 10 and metal chamber 12 are electrically and physically connected together.

These electrodes serve the purpose of monitoring the level of the beverage within the inlet, and thus the level of beverage within chamber 12, and suitable control means is actuated in response thereto to control the supply of ingredients for the beverage to the inlet, as will be explained more fully in detail below.

All commercially available machines for preparing and dispensing carbonated, frozen beverages of this type are adapted to dispense at least two distinct beverage flavors. Thus, the description of the control system of the invention will be with reference to two distinct flavors, especially for the purpose to show that the control system is adapted for controlling two or more mixing and dispensing operations. A first container or syrup tank 110 that contains a syrup having a first flavor has connected therein a tube 112 through which the syrup is drawn and a pipe 114 that opens the interior of the container to the atmosphere. A similar container 116 contains a syrup of a different flavor and has a tube 118 connected therein through which the syrup is drawn and a pipe 120 that opens the interior of the container to the atmosphere.

As already noted, the beverage is comprised of a syrup, water and carbon dioxide. Accordingly, a water supply is provided and comprises a tank 122 into which a tube 124 extends for withdrawal of water 126 therefrom. Because of municipal ordinances, water used within such a dispensing machine must not be allowed to back up for any reason into the water main from which it is supplied in case of a malfunction. Thus, water is supplied to the tank through outlet 130 opening in a conduit 128 connected to a suitable water source (not shown). A float valve 132 is used to regulate the supply of the water to the tank at a level below outlet 130.

Syrup from one of the containers and water from tank 122 is supplied to the inlet conduit 88 through a first pump 140. The pump is electrically operated by means of electrical connections 134 and 135 connected to a control unit 180, the latter of which will be described in detail in conjunction with FIGURE 5. The pump is of any suitable construction for pumping liquids as is well known. To supply the syrup and water to the inlet 76, conduit 112 from syrup tank 110 and conduit 124 from the water tank are connected to pump 140, wherein the outlet 124 from the water tank is used to supply another pump and dispensing machine to be described later. To provide this, conduit 124 has one branch 144 connected to the inlet of pump 140 and another branch 146 connected to the inlet of another pump 142. The outlet of pump 140 is connected to the supply conduit or pipe 88 leading into the inlet 76. Pump 142 is also electrically operated by means of connections 136 and 137 connected to the control unit 180.

Carbon dioxide is supplied to the system from a tank 150 through line 152 that is branched into two connections 154 and 156 leading into valves 158 and 162, respectively, the latter of which are operated by means of solenoids 160 and 164. The outlets from valves 158 and 162 are connected by lines 166 and 168, respectively, into conduit 88 leading into the inlet 76 on the outlet side of pump 140 and into conduit 148 on the outlet side of pump 142 leading into another inlet 222 supplying another beverage chamber. Solenoid 160 is electrically operated from control unit 180 by means of electrical connections 208 and 209 connected thereto, and solenoid 164 is operated from the control unit through electrical connections 211 and 212 connected thereto.

The control unit, which will be described in detail with reference to FIGURE 5, controls the operation of the entire system except for selected manual operations to be noted below, and is electrically operated from any suitable alternating voltage supply through plug 182. A manual double pole single throw switch 184 is connected between the control unit and the power supply.

This system is adapted to monitor the level of the liquid or beverage within the dispensing machine and to supply ingredients thereto when needed, but also monitors the supply of syrup and water and to deactivate the entire system should one or more of the containers of syrup or water become exhausted. To provide this function, spaced apart electrodes 190 and 192 are connected into the interior of the water line 124 leading from the tank 122 and are connected to the control unit 180 by means of electrical connections 193 and 194, respectively. Similarly, spaced apart electrodes 196 and 198 are connected into the interior of outlet line 112 from syrup tank 110 and are connected to the control unit 180 by means of electrical connections 199 and 200, respectively. Spaced apart electrodes 202 and 204 are connected into the interior of outlet line 118 of syrup tank 116 and are connected to the control unit 180 by means of electrical connections 205 and 206, respectively. Preferably, the outlet lines 124, 112 and 118 are plastic hoses, or are constructed of non-conductive materials, so that the pairs of electrodes disposed in the interior thereof are electrically insulated from one another except through the conducting path provided by liquid contained within the lines. If these lines are metal, the electrodes are, of course, insulated from the line itself.

It has already been noted with reference to the machine described in the above noted copending application that it is important that the beverage contained within the mixing and dispensing chamber 12 be maintained at a volume or level that is substantially less than the volume of the chamber itself. This allows expansion during freezing of the beverage within the chamber and provides a carbon dioxide head above the beverage, among other reasons. Be this as it may, the system of the invention is adapted for controlling the liquid within the container at any desired level for any chamber. It will be recognized by those familiar with the operation of these types of machines that problems are experienced during freezing of beverage, in the expansion thereof and in the rise of the beverage in its frozen state within the vertical tube 80 of the inlet conduit. As beverage is dispensed from the machine, the general level 81 of the beverage is lowered, and the beverage whether in the liquid or frozen form contained within the inlet conduit drips by gravity into the inner chamber 12 as a result thereof. However, pockets or voids can be formed within the vertical tube 80 during freezing that can give erroneous indications of the actual level of the beverage within the container 12. The control system of the invention is so constructed and adapted to supply the proper amounts of ingredients to the container regardless of the problems or occurrences herein above noted.

The control system will best be understood from a description of the operation of the beverage machine and the control of the supply or ingredients thereto. Assuming liquid is dispensed from the container through outlet 50 and discharge spout 56, the level 81 will drop within the inner container and, consequently, any beverage ingredients, whether in the liquid or frozen state, will tend to drop within the vertical tube 80. Should the level of the liquid within the inlet conduit drop below electrode 100, the electrical conducting path between electrode 100 through the liquid or frozen beverage within vertical pipe 80, frozen beverage 81 within the inner chamber 12 and up through and to the metallic outer container 10 to ground 220, will be broken. This is equivalent to the opening of a switch so that control unit 180 activates pump 140 and solenoid valve 158 to draw syrup from supply container 110, water from reservoir 122 and carbon dioxide from container 150 into the inlet 76 to replenish the supply and raise the level within inner chamber 12. It will be noted at this point that syrup and water are drawn into the inlet by means of pump 140, and that the carbon dioxide is added to the outlet side of the liquid pump. It will be understood that carbon dioxide does not need to be forced as it is contained under pressure. As will be understood from the reading of the above noted copending application, it is desirable to inject or supply the beverage machine with a mixture of syrup, water and carbon dioxide in a premixed and foamy state so as to precarbonate the mixture as much as possible, which is effected by injection of the $CO_2$ into the outlet side of the liquid pump. The amount of carbon dioxide injected depends upon the opening of a suitable orifice within valve 158, which type of valve is well known. Carbon dioxide in excess of that needed for carbonization is supplied to maintain a $CO_2$ head at essentially atmospheric pressure within inner chamber 12, which also allows room for expansion of the beverage as it freezes.

Control unit 180 does not supply the ingredients to the inlet until the level of the ingredients drop below electrode 100, so that the electrical switch connection through the mixture is broken between electrode 100 and the outer metal container. On the other hand, the control unit does not cut off the mixture supply until the level has risen to the height of electrode 96. This spacing prevents erratic and continual opening and shutting of the supply to the inlet. Although the amount of liquid mixture normally added at one time, for example, that which occupies the space between electrodes 96 and 100, appear to be small, these ingredients expand to much larger proportions when frozen, in addition to which the level may drop substantially below electrode 100 during dispensing.

Control unit 180 shuts off the supply when the level rises to electrode 96 only if the mixture, whether frozen or liquid, completely fills vertical tube 80 up to electrode 96 so as to provide an electrical connection between electrode 96 and the outer metal container 10. Should, for any reason, a void or pocket be created within conduit 80 between electrode 96 and the bottom open end 82 thereof, the electrical connection is broken and the switch is not closed. In this event, the control unit 180 continues to maintain the supply system actuated to supply mixture to the chamber, and if suitable control means were not provided, the chamber and the inlet conduit would be over-supplied and caused to run over. To prevent such an occurrence, the uppermost electrode 92, vertically spaced above electrode 96, is connected directly to ground potential 220 through connection 94. In the event that an electrical connection is not provided between electrode 96 and the outer metal container 10 when the level within conduit 80 rises to electrode 96, the mixture will be continued to be supplied to the inlet until the level attains that of electrode 92. In no event will there occur a void in the mixture that will prevent an electrical connection between electrodes 92 and 96 should a sufficient supply of mixture be added to the inlet. Thus, an electrical connection is completed between electrodes 92 and 96 in this event, and control unit 180 deactivates the system to stop supply of mixture to the chamber. It will be clearly noted that the level of the mixture must drop below electrode 100 before control unit 180 activates the supply of mixture to the chamber, and must rise to electrode 96 while at the same time completing an electrical circuit between electrode 96 and the outer metal container 10 through the mixture before the supply is stopped. Alternatively, the mixture must rise to the level of electrode 92 to complete an electrical connection between electrodes 92 and 96 before the supply is stopped.

The control system also monitors the supply container of syrup and water and shuts off the entire system should either become exhausted. The liquid within conduit 124 acts as a switch to complete an electrical connection between electrodes 190 and 192 to maintain the system actuated, but when the water is exhausted, the connection is broken. Similarly, the system is maintained actuated so long as syrup from tank 110 is contained between electrodes 196 and 198 to complete the connection. In like fashion, the system is maintained in an actuated condition so long as syrup is contained between electrodes 202 and 204 in line 118. It is obvious that as many syrup containers, or water containers, can be monitored and operated as desired. For illustrative purposes only, another inlet 222 for a distinct mixing and dispensing apparatus is shown, which inlet includes a top 223 through which a pipe 224 extends to open the inlet to the atmosphere. Conduit 148 from pump 142 extends into this inlet as described with reference to inlet 76. Similarly, electrodes 225, 226 and 227 are connected into the inlet in like fashion, wherein electrode 225 is connected to ground potential 220. Should more than two systems be operated, additional take-offs from the water reservoir and carbon dioxide tank, an additional pump and an additional syrup tank will be provided.

The inlet 76 is shown in its preferred configuration insofar as the relative slopes of the walls of the various section. Section 84 has a sloped floor very nearly the horizontal, whereas intermediate section 86 through which electrodes 96 and 100 are connected is of almost vertical slope. Various conditions of the beverage mixture are shown in the fragmentary, side elevational views, in section of FIGURES 2–4, wherein the reason for the slopes of the various sections of the inlet will become more readily apparent.

Referring to FIGURE 2, there is shown a condition of the mixture in the inlet wherein a void has been created between electrode 100 and bottom open end 82 of the vertical pipe 80. This pocket, indicated by numeral 232 can be created between the level 230 of mixture in a frozen state in section 80 and all additional frozen mixture lodged thereabove, whereby this condition is created as a result of freezing and expanding of the mixture in the inlet. More specifically, any of the mixture previously added in the liquid state will eventually be frozen in tube 80 due to the thermal connection provided, and will expand upward as it freezes. Carbon dioxide, and perhaps some air due to the direct coupling to the atmosphere, will sometimes be trapped at an intermediate level within the vertical tube as the mixture expands upward and creates the pocket 232. Thus the electrical connection is broken between electrode 100 and outer metal container 10 which, even though the inner chamber contains a sufficient amount of mixture, yields an erroneous indication that the mixture has dropped below that level for actuating supply to the chamber. The supply means is therefore actuated and liquid mixture is added until the level within section 76 of the inlet rises to electrode 92, at which time the supply is deactivated. Without electrode 92, it would be possible for the level of the mixture to overfill the inlet.

As beverage is again dispensed from the chamber, the level 238 within tube 80 and section 86 drops accordingly as shown in FIGURE 3, but because the mixture is normally in a frozen state, a cavity 242 will often be formed through the core or along the axis of the inlet, thus leaving a mass 240 on the floor of the more horizontal section 84. As the level drops below electrode 100, mixture in the liquid state is added. This mixture emerges into the inlet from conduit 88 in a premixed and foamy state, or as a spray, and thus melts the mass 240 and washes it into the center of the inlet to provide a uniform level 246 of the mixture to complete the electrical connection between electrode 96 and the outer metal container 10 as shown in FIGURE 4.

Figure 5:
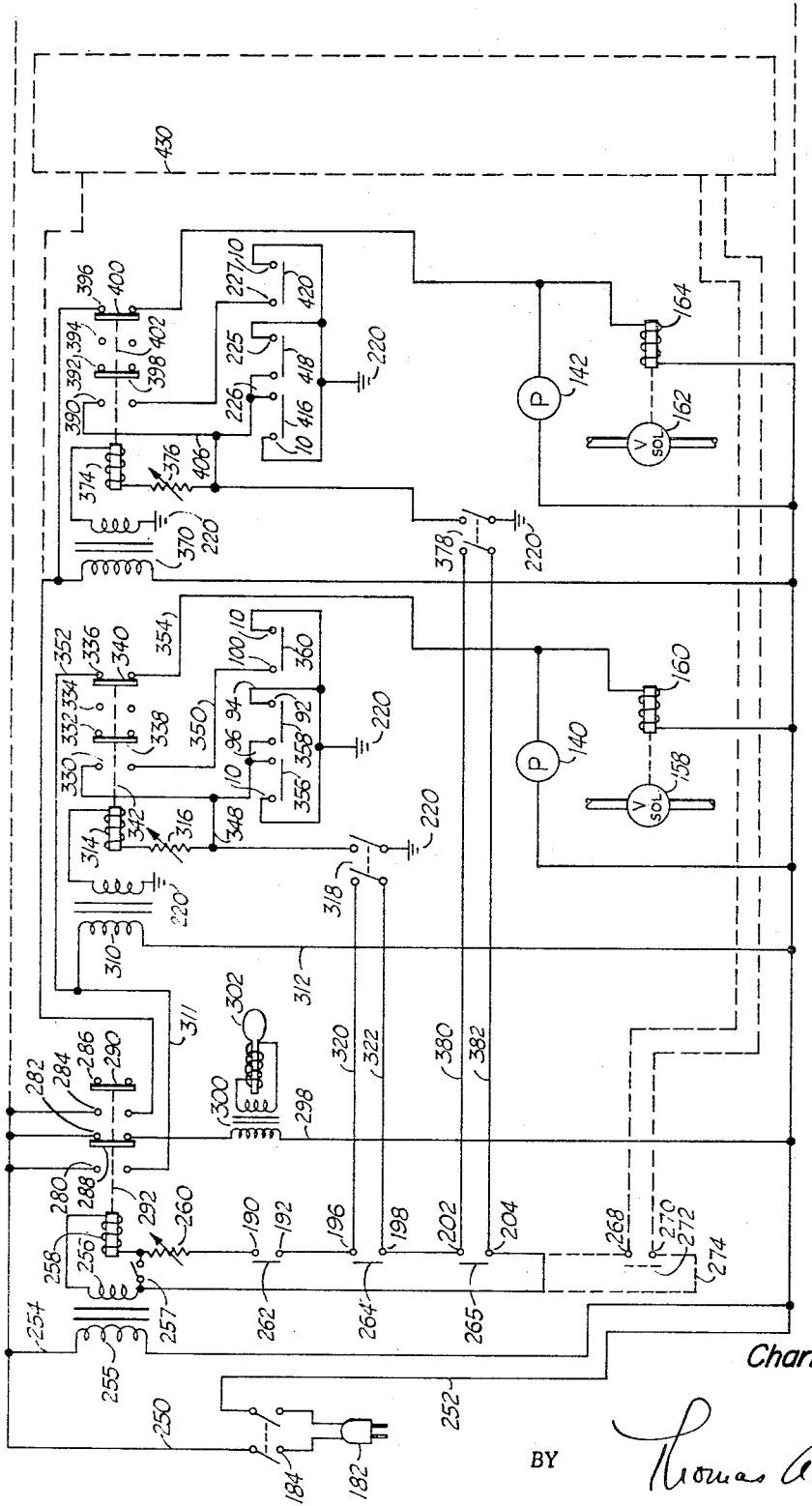
FIGURE 5 is an electrical schematic diagram of the supply means and control means for operating the beverage machine shown in FIGURE 1.

An electrical schematic diagram of the control circuit employed in conjunction with the various detector electrodes is shown in FIGURE 5. Electrical power derived from any suitable A.C. source through plug 182 is connected to the control circuit by means of electrical connections 250 and 252 through main switch 184. The control system itself operates on 24 volts A.C., and a stepdown transformer 254 is connected at its primary 255 across the main power source. The secondary 256 of the transformer is connected in series with a solenoid 258 that actuates a multiple pole switch to be described later, and in series with a variable resistor 260. Also connected in series with this arrangement are switches 262, 264, and 266, which switches correspond to the various pairs of electrodes that are employed in the supply lines from the syrup and water tanks. That is to say, electrodes 190 and 192 employed in the water line 124 constitutes a switch that is closed when water is contained in the line and is open when the water tank is exhausted. Similarly, electrodes 196 and 198 constitute a switch which is closed when syrup is contained in line 112, and opens when the syrup supply line becomes exhausted. Similarly, electrodes 202 and 204 constitutes another switch that is closed when syrup is contained in line 118 and opens when this syrup supply line is exhausted.

As many additional electrode arrangements can be provided as desired to handle additional beverage dispensing machines. To illustrate this, an additional switch 272 with poles 268 and 270 is drawn in phantom as connected in series with the other switches through electrical connection 274.

Solenoid 258 is operative to actuate a multiple pole switch for certain control functions by means of mechanical connection 292. This multiple pole switch comprises a first pair of poles 280 and a second pair of poles 282 between which a switch contact 288 is actuated, and a third pair of poles 284 and a fourth pair of poles 286 between which a second contact 290 is actuated. It will be noted here that when contact 288 closes across poles 282, contact 290 closes across poles 286, and similarly, poles 280 and 284 are closed concurrently. One terminal of each of poles 280, 282 and 284 is connected directly to the high voltage line 250. The primary of another stepdown transformer 300 is connected in series with the other terminal of pole 282 and the other high voltage line 252 from the main power source. The secondary of stepdown transformer 300 is connected to a suitable electrical buzzer 302, or other suitable electrical alarm means, so that the bell is actuated to ring when an alternating current flows through the primary of the transformer.

It will be observed that current cannot pass through the secondary 256 of stepdown transformer 254 unless all of switches 262, 264 and 266 are closed, which is a condition where none of the ingredient supply tanks are exhausted. It will be seen later that should one of these switches be opened, the entire system is deactuated so that the operator knows that one of the supply tanks is exhausted and can replenish same. At the same time, buzzer 302 is energized to notify the operator. It will be remarked, however, that the electrical system can be designed so that only that mixing chamber which is supplied from the exhausted syrup tank is deactuated rather than all mixing and dispensing machines.

The primary of another stepdown transformer 310 is connected in series between the other terminal of poles 280 and the high voltage line 252, and in similar fashion, the primary of another stepdown transformer 370 is connected in series with the other terminal of poles 284 and the high voltage line 252. These two stepdown transformers are used to supply voltage to control circuits for operating and monitoring the level of the beverage within the inlet conduit of two separate dispensing machines, respectively. For the first machine, the secondary of transformer 310 is connected at one terminal to ground potential 220 and at the other terminal in series with solenoid 314, variable resistor 316 and one of the poles of a double pole, single throw switch 318, the other terminal of this pair of poles being connected to ground potential 220. When switch 318 is closed, current can flow through the secondary of transformer 310 and solenoid 314 but only if current flows through the primary of this transformer.

Solenoid 314 actuates a pair of switch contacts between a plurality of switch pole pairs 330, 332, 334 and 336. This switch is similar to the switch previously described and includes switch contact 338 actuated between pole pairs 330 and 332, and switch contact 340 actuated between pole pairs 334 and 336 by means of mechanical connection 342 connected to the solenoid. One side of pole pair 330 is connected by means of electrical connection 346 to the lower side of variable resistor 316 and to the intermediate electrode 96 within the inlet 76. Since a switch can be closed between intermediate electrode 96 and electrode 92, and also between electrode 96 and ground potential through the mixture and metal container 10, thus constituting two switches, two poles have been indicated for electrode 96 in the schematic drawing of FIGURE 5. The other side of pole pair 330 is connected by connection 350 to the lowest electrode 100 within the inlet conduit. One side of pole pair 336 is connected by connection 352 to the high voltage line 250 through pole pairs 280 of the main control, and at the other side by means of connection 354 in series with solenoid 160 that actuates valve 158 in the carbon dioxide line and to the other high voltage line 252. Pump motor 140 is connected in parallel with the solenoid 160. The other pole pairs 332 and 334 are dummies.

Referring to FIGURE 1 and to FIGURE 5 together, it has been remarked that electrical contact can be established between electrode 96 and ground potential 220 through the beverage mixture contained within the inlet 76 down through vertical pipe 80, through the frozen beverage 81 and metal container 10. This particular connection or conducting path is indicated by numeral 356 in FIGURE 5 as being a switch connection between electrode 96 and the outer metallic container 10, the latter of which is connected to ground potential 220. Another electrical conducting path can be established between electrode 96 and 92, which connection is indicated by numeral 358. As seen in FIGURE 1, electrode 92 is connected to ground potential 220 through the metal outer container 10 by connection 94. Finally, an electrical connection can be established between electrode 100 and ground potential 220 through the mixture within pipe 80, the beverage within the inner chamber 12 and through the outer metal container 10. This electrical conducting path is indicated by numeral 360.

The operation of one of the beverage mixing and dispensing chambers will now be described. It will be assumed that none of the ingredient supply tanks are exhausted so that all of switches 262, 264 and 266 are closed. In this event, current passes through solenoid 258 and actuates switch contacts 288 and 290 to close switch pole pairs 280 and 284, respectively. Closing of switch pole pair 280 connects the primary of transformer 310 across the high voltage line, so that current flows through the primary. Switch 318 is a manually operated switch whose function will be described later, but which is normally left in the open condition as shown. Thus current cannot flow through this switch and another path must be provided for current to flow through the secondary of transformer 310. It will be assumed that, although there is ample supply in the ingredient tanks, the level of mixture in the inlet 76 is below electrode 100, so that the control circuit will be operative to supply ingredients to raise the level within the mixing and dispensing chamber. With the level of the beverage below electrode 100, switch 360 is open, and similarly, switches 356 and 358 are open. With no electrical path provided for current to flow through solenoid 314, switch contacts 338 and 340 remain in their respective positions as shown. Contact 340 closes the circuit between pole pairs 336 and current flows through pump motor 140 to draw water and syrup into the inlet 76. At the same time, current passes through solenoid 160 to actuate valve 158 to add carbon dioxide to the liquid mixture. As the beverage added to the chamber rises to a level to contact electrode 100, switch 360 closes to complete an electrical circuit between electrode 100 and ground potential 220. However, since pole pairs 330 are open, the closing of this switch at this time has no effect. As the beverages continue to rise to a level that contacts electrode 96, switch 356 closes between electrode 96 and ground potential 220 through the metal chamber 10, assuming that there is no pocket below the level of electrode 100 that would break the circuit. Upon the closing of the switch, a path is provided for current to pass through solenoid 314, variable resistor 316 and electrical connection 348 to ground potential 220. The solenoid then actuates switch contact 338 to close pole pairs 330, and switch contact 340 to close pole pairs 334, the latter of which are dummies. Switch contact 340 therefore breaks the electrical connection between pole pairs 336 and stops the operation of pump 140 and current from passing through solenoid 160. Thus the supply is cut off and remains in this condition so long as current passes through solenoid 314.

Assuming that a pocket or void is created in the vertical pipe 80 upon freezing of the beverage as shown in FIGURE 2 to open contact 360, electrical contact 356 is not closed when the beverage reaches a level that contacts electrode 96. Therefore supply of the ingredients would be continued until the level of the beverage contacts electrode 92. At the same time, the beverage will be in contact with electrode 96 so that switch 358 is closed therebetween to make contact with ground potential 220 through electrical connection 94. This produces the same result insofar as a current path through solenoid 314 in the actuation of the various switch contacts, and thus the supply is stopped at this time. Again, the system will remain in this state until the level of beverage within the inlet drops to a predetermined minimum level, or below electrode 100.

Assuming that beverage is dispensed from the machine to cause the level of the beverage within the inlet to drop, the control system will not acutate the pump and carbon dioxide solenoid valve when the level drops away and out of contact with electrode 92. The reason for this is that switch contact 338 now closes the circuit between pole pairs 330 to provide an electrical conducting path from ground potential 220 through the secondary of transformer 310, the solenoid 314, variable resistor 316, electrical connection 348, pole pairs 330 through switch contact 338, through electrical connection 350 and switch 360, which is the beverage conducting path between electrode 100 and ground potential 220 through the metal outer container 10. When the level drops below electrode 100, the supply is again actuated. The foregoing assumes that there is not a pocket or void existing below electrode 100 that would break the electrical conducting path through solenoid 314 when the level drops away from electrode 92, or electrode 96. Should there be such a void created when beverage is dispensed from the machine, switch 360 would then be open as would switch 356 between electrode 96 and ground potential 220. Switch 356 will be opened as soon as the beverage level drops below electrode 92, thus stopping the current flow through solenoid 314. The switch contacts 338 and 340 then return to their positions as shown in the figure and pump motor 140 and solenoid 160 are again actuated. As soon as beverage is added to the inlet, all beverage that is frozen within the conduit is melted by the liquid stream and all voids are filled. Thus the inlet conduit is filled until the level reaches electrode 96, at which time the system is shut off.

Should any supply tank become exhausted, the corresponding switch denoted by one of switches 262, 264 and 266 will be opened, thus removing power from transformer 310 and that particular control circuit. Thus power is removed from all of the control circuits that operate the corresponding beverage containers, including removing power from pole pairs 336 that operated pump 140 and solenoid valve 158. The bell 302 is also energized to inform the attendant who replaces the exhausted supply tank. However, the system must be primed before the particular one of switches 262, 264 and 266 will remain shut.

To prime the system, a single pole, single throw switch 257 is connected directly between one terminal of privacy 256 and solenoid 258 to shunt out all contacts 262, 264, and 266. This switch is manually held closed to re-establish power to all auxiliary controls until that particular pump has been operated to prime the supply line. Thereafter, the system is again automatic.

In the event an exhausted supply tank cannot be replenished, it is desirable to maintain operative the other dispensing chamber. To effect this, each auxiliary control circuit is provided wtih a switch to effectively disconnect it from the main control. Thus switch 318 is provided, being a double pole, single throw, wherein contact 264 is shunted when the switch is closed. This maintains the main control operative should the supply tank corresponding to contact 264 and electrodes 196 and 198 be exhausted. At the same time, closing of switch 318 provided a complete circuit for current to be conducted through solenoid 314 through the secondary of transformer 310 and variable resistor 316. The effect of this is to open pole pairs 336 that operated the pump and maintain it inoperative regardless of the condition of the beverage level within the dispensing chamber.

The system as just described had reference to a single dispensing chamber, but as already mentioned, as many chambers can be operated simultaneously as desired. A second chamber control circuit is shown in FIGURE 5 that is identical to the auxiliary control just described. Thus another transformer 370 is connected at the primary to pole pairs 284 of the main control switch, and at the secondary to a solenoid 374. This solenoid is connected in series with resistor 376 and one pair of poles of double pole, single throw switch 378, the latter of which performs the same function as switch 318.

Solenoid 374 actuates switch contact 398 between pole pairs 390 and 392, and switch contact 400 between pole pairs 394, and 396, whereby these pole pairs are connected as previously described. This dispensing chamber also includes a first switch contact 416, corresponding to contact 356, that closes between ground potential 220 through the metal container 10 and an intermediate electrode 226 that corresponds to intermediate electrode 96. Another switch contact 418, corresponding to contact 358, closes between the intermediate electrode 92. A third switch contact 420 closes between a lower electrode 227 corresponding to lower electrode 100 and ground 220 through container 10. Pump 142 and solenoid 164 and corresponding valve 162 are connected to pole pairs 396 as previously described.

As many other dispensing chambers and auxiliary control circuits as desired can be employed, as shown schematically in phantom by numeral 430, in which case, identical circuits are used.

Figure 6:
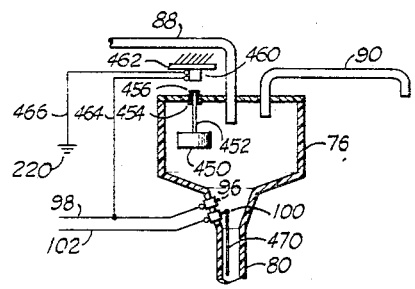
FIGURE 6 is a fragmentary, side elevational view of an alternate form of inlet conduit using a float in cooperation with sensing electrodes.

Another embodiment of a sensor means that can be employed in the inlet of the beverage dispensing machine in an alternative to the highest electrode 92 shown in FIGURE 1 is shown in the fragmentary, side elevational view, in section, of FIGURE 6. In this embodiment, the inlet again employs the intermediate electrode 96 and lower electrode 100 for the purposes described earlier. Rather than employing the higher electrode 92, however, a float member 450, comprised of any suitable material that is buoyed upward by the liquid or frozen beverage within inlet 76 is attached to a rod 452 that extends upward and through the top 78 of inlet. The rod 452 passes through a bushing 454 and has a shoulder 456 attached to its top end which limits the float to a lowermost position when seated against the bushing when the level of the beverage within the inlet is below the float. A substantial tolerance is provided between the rod 452 and the bushing 454 to allow free movement of the float and rod upward to prevent binding of the rod within the bushing.

Disposed immediately above the upper end of the rod is a micro switch 460 that is closed when shoulder 456 on the upper end of the rod engages the switch, wherein this occurrence is caused by the level of the beverage within the inlet buoying the float upward. The micro switch is supported in the proper position from any suitable structural member 462. An electrical connection 464 connects one terminal of micro switch 460 to electrical connection 98 connected to electrode 96, and another electrical connection 466 connects the other terminal of the micro switch to ground potential 220. When the micro switch is closed by elevation of float 450, a direct electrical connection is made between electrode 96, or its electrical connection 98 that is connected to the control box 180, and ground potential to stop the supply of the liquid beverage to the inlet 76, which is the equivalent of that achieved when employing the upper electrode 92 is shown in FIGURE 1.

Earlier reference was made to the relatively small difference in the two levels of the electrodes 96 and 100, whereby the supply is deactuated under normal conditions when the level reaches electrode 96 within the inlet and whereby the supply is actuated when the level within the inlet drops below electrode 100. As was already mentioned, the difference between the volume of the liquid as supplied to the inlet and the volume of the beverage when frozen is considerable, thus preventing an erratic and continual actuating and deactuating of the supply. In some instances, however, it may be desirable to permit a much greater difference in the level between the lower and intermediate electrodes so that much more beverage can be dispensed from the machine before the supply is actuated.

A variation of the electrode scheme shown in FIGURE 1 is also shown in FIGURE 6, wherein a suitable metal wire of electrode of extended length, such as comprised of stainless steel for sanitary purposes, is connected to electrode 100 within the inlet itself and extends downwardly into the vertical conduit 80. This particular electrode extension 470 can be of any desired length to yield the desired effective levels between electrodes 96 and 100. Thus the supply will not be actuated until the level within the vertical conduit 80 drops below the bottom tip of electrode extension 470, and will not be deactuated until the beverage rises to the level of electrode 96.

Figure 7:
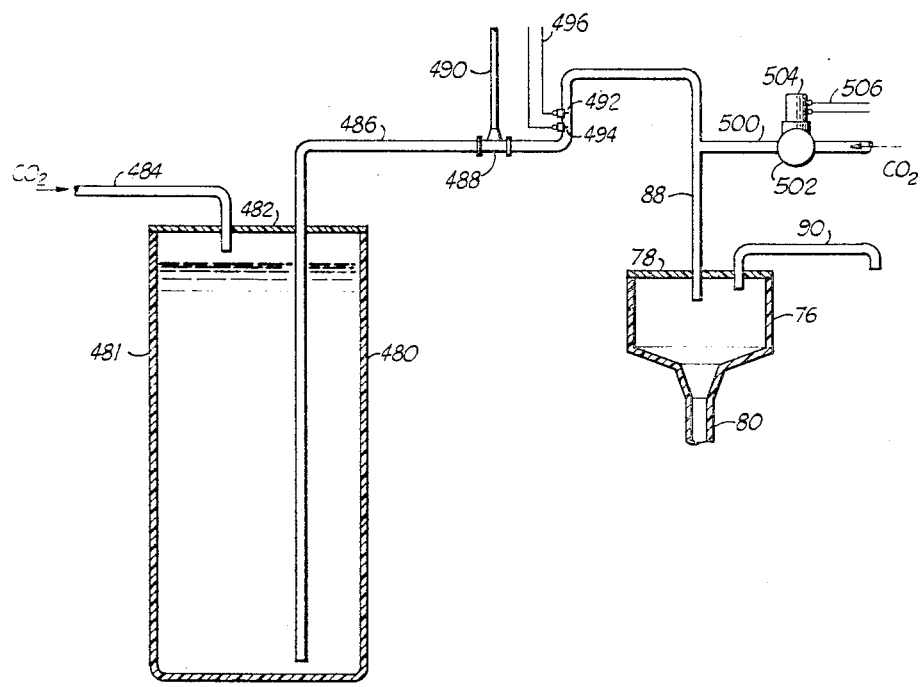
FIGURE 7 is a fragmentary side elevational view of an alternative embodiment of the invention wherein there is a pre-mixing of the beverage components.

The invention has been described so far with reference to what will be referred to as a post-mix system wherein post-mix refers to mixing of the water, syrup, and carbon dioxide upon the system being actuated to supply ingredients to the inlet of the beverage freezing and dispensing machine. The system of the invention, however is also equally applicable to what will be referred to as a pre-mix operation, whereby water, syrup, and carbon dioxide in the proper proportions are previously mixed and bottled in suitable containers. Such a pre-mix canister of beverage is well known in the industry and is employed widely on dispensing machines that do not actually freeze the beverage. An adaptation of the system of the invention for a pre-mix operation is shown in the schematic diagram of FIGURE 7.

A canister 480 is employed for containing a pre-mixed beverage 481 of syrup, water, and carbon dioxide in the proper proportions, it being understood that this pre-mixed solution is normally carbonated. A top 482 seals the interior of the canister from the atmosphere, and a conduit 484 passing through the top of the canister and opening into the top interior thereof is employed through which carbon dioxide under pressure is passed to force the pre-mixed solution out of the canister. An outlet conduit 486 through which the solution passes out of the canister extends through the top 482 and terminates in an open end adjacent to bottom of the container. Carbon dioxide pressure is maintained on the canister through line 484 from any suitable supply (not shown) so that the pre-mixed liquid beverage will be forced out of the canister when the solenoid valve 488 connected in line 486 is opened by means of an electrical signal applied through connection 490 connected thereto. This particular solenoid valve 488 replaces the pump and motor connected to the supply line of FIGURE 1, and is thus operated through the control box 180 in a similar manner as will be understood.

The other side of the solenoid valve 488 is connected directly to the inlet conduit 88 passing into inlet 76. Again, spaced apart electrodes 492 and 494 are connected in the outlet side of the line from the solenoid valve for monitoring and sensing when the canister 480 has become exhausted of the beverage, with electrical connections 496 connected thereto leading to the control box. Carbon dioxide is again applied to conduit 88 through connection 500 for the same purpose as earlier described. To effect this, another valve 502 operated by solenoid 504 from electrical connections 506 is employed, all as previously explained. Thus, by eliminating a separate water supply and replacing the pump with a solenoid valve 488, the system is changed from a post-mix operation to a pre-mix operation.

It will also be apparent that since the first embodiment of the system shown in FIGURE 1 is effective for carbonating the beverage, the pre-mix solution 481 contained within canister 480 does not have to be previously carbonated. Rather, this mixture can be comprised of water and syrup only in the proper proportions, which carbonation being effected as before.

Certain embodiments of the invention have been described with particularity in the foregoing specification, but it is to be understood that modifications and substitutions that do not depart from the true scope and intent of the invention will undoubtedly occur to those skilled in the art. Therefore, it is intended that the invention be limited only as defined in the appended claims.

What is claimed is:
1. A system for controlling the supply of ingredients in the liquid state to a chamber within which the ingredients are frozen through an inlet provided in said chamber, comprising:
   (a) first and second vertically spaced apart electrodes disposed in said inlet for contacting said ingredients contained in said inlet;
   (b) first means for supplying said ingredients in the liquid state to said chamber through said inlet;
   (c) second means connected to said first and said second electrodes and to said first means for actuating said first means to supply said ingredients to said chamber when the level of said ingredients within said inlet drops below the lower of said first and said second electrodes, and for deactuating said first means when said ingredients rise to a level to form a conducting path through said ingredients between said chamber and the higher of said first and said second electrodes; and
   (d) third means disposed in said inlet above said higher of said first and said second electrodes to cause said first means to be deactuated when said ingredients rise to the level of said third means in the event of a discontinuity in said conducting path.

2. A system as set forth in claim 1 wherein said first and said second electrodes are electrically insulated from said chamber through said inlet.

3. A system as set forth in claim 1 wherein said third means comprises a third electrode connected electrically common to said chamber.

4. A system as set forth in claim 3 wherein said second means includes fourth means for deactuating said first means when a conducting path is established through said ingredients between said third electrode and said higher of said first and said second electrodes.

5. A system as set forth in claim 3 wherein said first means includes a supply line means through which said ingredients are passed from reservoir means to said inlet, and said second means includes sensor means connected in said supply line means for detecting when said reservoir means is exhausted of ingredients for deactuating said first means upon this occurrence.

6. A system as set forth in claim 5 wherein said sensor means comprises a pair of spaced apart electrodes connected in each supply line of said supply line means between which an electrical conducting path is established when ingredients are contained in said supply line, and said second means is responsive to a discontinuity in said electrical conducting path to deactuate said first means.

7. A system as set forth in claim 5 wherein said second means additionally comprises a first control circuit to which said first and said second electrodes are connected for controlling said first means responsive to the condition of said ingredients in said inlet as detected by said first and said second electrodes, and a second control circuit connected to said first control circuit to supply electrical power thereto and to which said sensor means is connected for controlling said first means responsive to the condition of said ingredients in said supply line means to remove electrical power from said first control circuit when said reservoir means is exhausted of ingredients.

8. A system as set forth in claim 1 wherein said third means comprises electro-mechanical means connected to the higher of said first and said second electrodes for connecting said higher of said first and said second electrodes in electrical power common to said chamber when said ingredients rise to a predetermined level.

9. A system as set forth in claim 1 wherein the lower of said first and said second electrodes comprises an elongated conducting member extending downward into said inlet, whereby said first means is actuated by said second means when the level of said ingredients within said inlet drops below the lower end of said elongated conducting member.

References Cited

UNITED STATES PATENTS

| | | | |
|---|---|---|---|
| 2,665,559 | 1/1954 | Dexter | 62—179 |
| 2,782,016 | 2/1957 | Iannelli | 137—392 X |
| 3,270,918 | 9/1966 | Goodrich et al. | 222—64 |

ROBERT A. O'LEARY, *Primary Examiner.*

W. E. WAYNER, *Assistant Examiner.*